United States Patent [19]
Balick et al.

[11] Patent Number: 5,802,291
[45] Date of Patent: Sep. 1, 1998

[54] SYSTEM AND METHOD TO CONTROL AND ADMINISTER DISTRIBUTED OBJECT SERVERS USING FIRST CLASS DISTRIBUTED OBJECTS

[75] Inventors: Maurice Balick, Fairhaven, Md.; Arthur A. van Hoff, Palo Alto; Roderick J. McChesney, Redwood City, both of Calif.

[73] Assignee: Sun Microsystems, Inc., Palo Alto, Calif.

[21] Appl. No.: 413,402

[22] Filed: Mar. 30, 1995

[51] Int. Cl.$^6$ .............................. G06F 13/00; G06F 9/06
[52] U.S. Cl. .............................. 395/200.32; 395/200.54; 395/684
[58] Field of Search .................. 395/200.1, 200.03, 395/200.09, 200.01, 500, 650, 200.011, 200.18, 200.32, 200.33, 200.54, 683, 684

[56] References Cited

U.S. PATENT DOCUMENTS

| | | | |
|---|---|---|---|
| 5,265,254 | 11/1993 | Blasciak et al. | 395/700 |
| 5,335,339 | 8/1994 | Maejima et al. | 395/500 |
| 5,339,430 | 8/1994 | Lundin et al. | 395/700 |
| 5,371,746 | 12/1994 | Yamashita et al. | 371/91 |
| 5,379,426 | 1/1995 | Foss et al. | 395/650 |
| 5,396,630 | 3/1995 | Banda et al. | 395/700 |
| 5,410,688 | 4/1995 | Williams et al. | 395/600 |
| 5,421,004 | 5/1995 | Carpenter et al. | 395/575 |
| 5,423,042 | 6/1995 | Jalili et al. | 395/684 |
| 5,450,583 | 9/1995 | Inada | 395/650 |
| 5,450,586 | 9/1995 | Kuzara et al. | 395/700 |
| 5,463,775 | 10/1995 | DeWitt et al. | 395/184.01 |
| 5,475,625 | 12/1995 | Glaschick | 395/600 |
| 5,522,071 | 5/1996 | Guillen et al. | 395/650 |
| 5,548,717 | 8/1996 | Wooldridge et al. | 395/183.14 |
| 5,561,763 | 10/1996 | Eto et al. | 395/183.11 |
| 5,577,251 | 11/1996 | Hamilton et al. | 395/671 |
| 5,581,765 | 12/1996 | Munroe et al. | 395/677 |
| 5,603,054 | 2/1997 | Theimer et al. | 395/826 |
| 5,606,493 | 2/1997 | Duscher et al. | 395/200.32 |

FOREIGN PATENT DOCUMENTS

636 985 A1 1/1995 European Pat. Off. ........ G06F 11/30

OTHER PUBLICATIONS

The Common Object Request Broker: Architecture and Specifiaction, Digital Equipment Corp, et al. OMG Dcoumnet No. 93.xx.yy, Revision 1.2, Draft 29, pp. Table of Contents, 15–46, Dec. 1993.

SOMobjects Developer Toolkit Users Guide, Int'l. Business Machines, Ch. 6, v. 2.1, Oct., 1994.

*Primary Examiner*—Mark H. Rinehart
*Attorney, Agent, or Firm*—Fenwick & West LLP

[57] ABSTRACT

A networked computer system contains a number of host computers with servers that provide various functionality to distributed clients on the network. Clients are able to access runtime information about servers on remote host computers, even where the clients have only object references to the servers through the presence of an embedded first class object within each server process. The first class object can be used to determine the process identification of the server process, counts of active objects and implementations in the server process, and to control tracing and logging functions provided by application programming interfaces utilized by the server.

22 Claims, 6 Drawing Sheets

SYSTEM AND METHOD TO CONTROL AND ADMINISTER DISTRIBUTED OBJECT SERVERS USING FIRST CLASS DISTRIBUTED OBJECTS

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

RELATED APPLICATION

This application is related to application Ser. No. 08/403,337 filed on Mar. 14, 1995, entitled SYSTEM AND METHOD FOR DETERMINING AND MANIPULATING CONFIGURATION INFORMATION OF SERVERS IN A DISTRIBUTED OBJECT ENVIRONMENT, which is incorporated herein by reference.

FIELD OF INVENTION

This invention relates to the field of object oriented application and operating systems development, and more particularly, to methods and systems for performing administrative operations on object oriented applications operating in a distributed object programming environment.

BACKGROUND OF INVENTION

Software applications are typically designed as self contained programs that have all the necessary procedural code and data included in the application or its immediate operating environment. Such programs generally have only limited access to the code and data of other applications, and particularly, are unable to execute procedures or access data that are not in the address space of the application. With the rise of object oriented programming, however, an application need not be designed as an atomic entity, but rather, applications can be comprised of objects that can access each other's operational code and data.

In object oriented programming, a first class object is an entity that can be directly manipulated by other entities in the program, instead of merely providing information or structures that define the programming environment. For example, in C++, a class definition is not a first class object because a class definition is only accessible to a compiler, and cannot be manipulated by other objects during actual execution of the program. In some object oriented languages, such as Smalltalk, a class definition is a first class object because it can be manipulated during execution of the application.

The objects can be designed to work in a distributed environment, typically a network of computers, where objects on various computers can provide various functionality to a given user. This style of application development is called distributed object programming.

Distributed object programming may be used to implement a distributed computing system. One predominant model of distributed computing is the client-server model. Here, servers are applications that provide operations and data to client applications. The clients and servers may be distributed in various computers on a network, or may reside in a single computer. In a client-server system based on a distributed object programming environment, a client is code that invokes or manipulates an object, and the entity that is invoked is the server. A server, commonly known as an object server, may contain multiple objects for performing various operations. The client and server can reside in the same process, a different process, in the same computer, or even in different remotely situated computers. A client invokes a server through an object reference, without having information as to where the invoked object resides in the system, that is, without specifically knowing the computer or process where the invoked object is stored or where its running. Rather, the client passes the object reference through an object request broker which locates the computer executing the server as a process, and passes back any output from the server to the client. To the user, the client and server, and any group of distributed objects, behaves transparently as an integrated application, even though the objects may be distributed in various computers. One standard for the distributed object programming is the Common Object Request Broker Architecture (CORBA) specified by the Object Management Group (OMG).

Information about a server can be classified into two categories. Dynamic information arises out of a particular process that is executing a server, such as its process identification, its current memory requirements or location, how many objects are active within the server, and the like. This information is dynamic because it depends on a current executing process which is transient. Static information does not devolve from a particular execution or process. This includes external information such as the location of where the server is installed, its pathname, its command line arguments, its configuration setup data, and internal information, such as the identity and description of the interfaces and implementations the server provides.

Most operating systems, such as UNIX®, provide system calls useful for determining dynamic information about the applications that are currently executing or ready to execute, such as how much primary memory they have been allocated, the address offset for the address space, which applications are currently running, on which machines, and the like. Such system facilities are used by application developers to debug applications during development, and by system administrators to diagnose and solve problems occurring during actual use. In conventional systems where the processes created by an application all reside on a single computer, information about a process executing an application can be obtained using conventional operating system routines.

However, in a distributed object environment, an object server does not exist as an object, but rather as a collection of discrete, and possibly remotely situated, objects providing related functionality to various clients. In this environment, there is typically no means for determining the state of remote server processes. This is for two reasons. First, there is no first class server object per se, but only a set of distributed objects, and thus a client cannot identify a specific server object for obtaining process information. Second, in a distributed object environment, the only remote constructs on which clients can operate at run-time are first class objects; since servers are embodied by processes (e.g. UNIX® processes), which in most computing platforms are not themselves objects, clients can not easily administrate servers. Without such information, generic debugging, error tracing, and logging are not possible, thereby impeding the development, debugging, and administration of applications created from distributed objects.

Accordingly, it is desirable to provide a computer implemented system and method for obtaining and modifying administrative information and behavior of server processes on remote computers in a distributed object programming environment.

SUMMARY OF THE INVENTION

This invention enables the implementation of generic administration tools for distributed object environments by providing an instance of a first class distributed object (hereafter referred to as the server spy) in each server on a host machine, and by making the interface and implementation of this server spy well suited to administrate the state and behavior of that server by a client holding an object reference to the server spy.

Each server spy object provides structures and methods for obtaining and modifying runtime information for processes created to embody the activated server. The server administrator object is used by client objects to access the server spy object for this information. The server spy object is embedded in each server during application development, by including it in a library of runtime code that is linked into server code developed by an applications developer.

The server spy object allows clients, both within the host computer maintaining a given server, and other remotely situated clients, to determine and control the operation of the server associated with the particular server spy object. Through the server spy object, the client can determine the process identifier of the server, even where the server is executing on a remote computer on the network. The client can control whether the server is subject to automatic deallocation of idle resource. The client may also manipulate, through the server spy, the output of tracing commands that may be included in the server by the applications developer, and where this information is output as log files.

DETAILED DESCRIPTION OF THE PREFERRED EMBODIMENT

Figure 1:
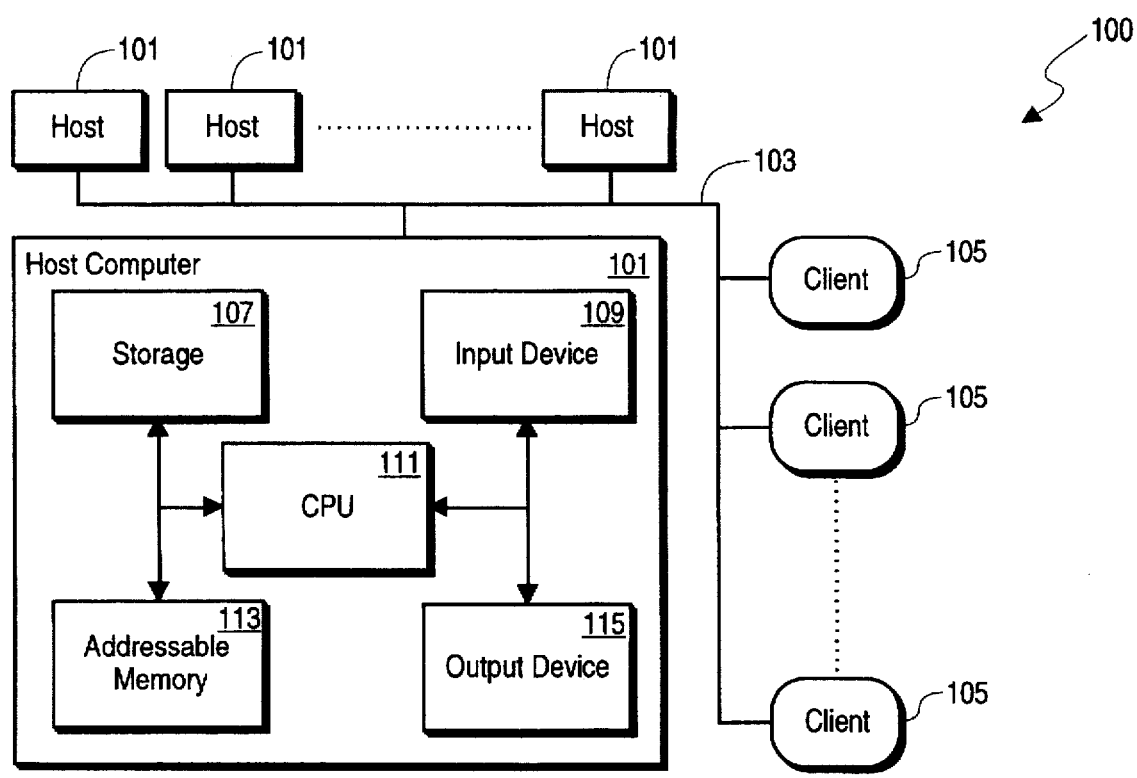
FIG. 1 is an illustration of the system of distributed computers for using server spy objects.

Referring now to FIG. 1 there is shown a hardware view of a system 100 for providing runtime information for servers on remotely distributed computers in a distributed object programming environment. The system 100 includes a number of host computers 101 connected along a network 103. Each host computer 101 includes secondary storage 107 for long term storage of implementation code and data for servers and clients, and the like, an input device 109 and an output device 115 for receiving and outputting commands and data into the system 100, and an addressable memory 113 for storing server (not shown) and client implementation code during execution by a processor 111. During execution by the processor 111, servers exist as processes in the addressable memory 113. Also coupled to the network 103 are a number of clients 105. Each client 105 is an object executing as a process in a remotely situated computer similar in structure to a host computer 101, or alternatively, existing as separate processes in any of the host computers 101. Each client 105 requests services or data from servers in host computers 101 on the network 103. The host computers 101 may be realized by most general purposes computers, such as a SPARCstation® computer manufactured by Sun Microsystems of Mountain View, Calif. Any other general purpose computer may also be adapted for use with the invention. Each host computer 101 executes a general purpose operating system, such as Sun Microsystems' Solaris® operating system. In addition, each host computer 101 is part of an object request broker environment, satisfying the CORBA standard set by the Object Management Group, in *The Common Object Request Broker: Architecture and Specification*, Rev. 1.2, OMG TC Document Number 93-12-43, available by anonymous ftp to omg.org. Other equivalent environments for distributed object systems may also be used. In the preferred embodiment, the object request broker environment is Sun Microsystems' Project DOE (Distributed Objects Everywhere).

Figure 2:
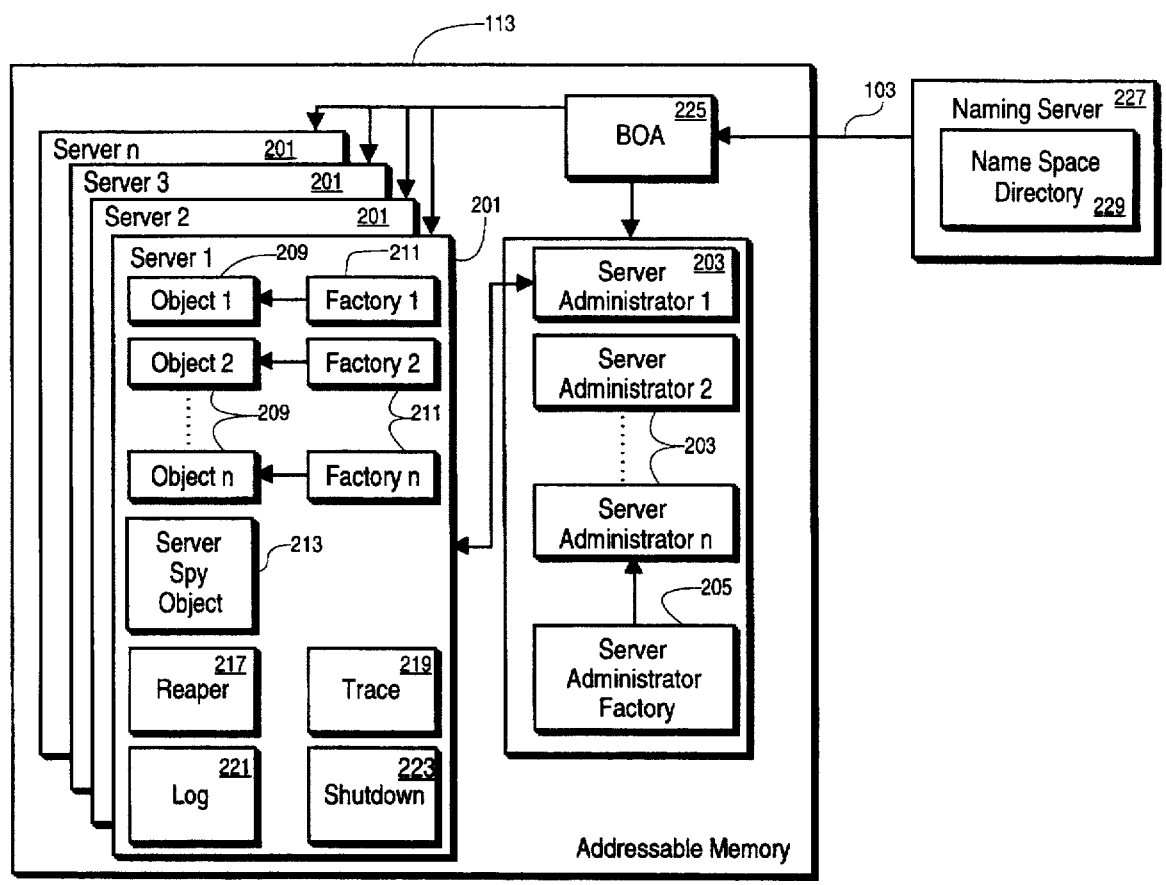
FIG. 2 is an illustration of the organization of a host computer supporting various servers.

Referring now to FIG. 2, there is shown a logical view of system 100, particularly illustrating the configuration of addressable memory 113 in any of the host computers 101 during runtime operation of various servers. The addressable memory 113 of each host computer 101 includes a number of executable objects for performing various functions, including user application functions, such as word processing, database management, graphics design, CAD engineering, software development, financial management, and the like, and operating system functions, such as memory management, resource allocation, storage management, and system accounting information, and network interfacing with remote clients and hosts.

More particularly, a host computer 101 includes a number of servers 201, each providing a particular type of functionality to clients 105 distributed on the network 103 (or locally executing in the host computer 101). Each server 201 is comprised of various object 209. For each server 201 on the host computer 101 there is a persistent server administrator 203 object instantiated from a server administrator class. Each server administrator 203 maintains execution configuration information for the particular server 201 associated with the server administrator 203, and all information that can be known whether or not the server 201 is executing. A server administrator 203 is created by a server administrator factory 205 when a server 201 is installed on the host computer 101. The server administrator 203 is more fully described the related application identified above.

Facilitating communication between the clients 105 and the host computers 101 is a basic object adapter 225, or BOA. The BOA 225 conforms to the requirements for a basic object adapter specified in CORBA. The BOA 225 provides an interface for clients 105 to access object implementations of objects 209 included in servers 201 on various host computers 101 distributed on network 103. Object implementations are actual code which implements an object 209. In order to efficiently manage the addressable memory 113 of the host computer 101, the BOA 225 maintains records indicating which servers 201 are active and inactive, and in each server 201, which objects 209 are active or inactive, and which implementations of object methods are also active or inactive. In this way the BOA 225 can readily manage memory resources in the addressable memory 113 on an as-needed basis, allocating memory to active servers 201, objects 209 and implementations, and deallocating memory from inactive entities. The BOA 225 receives a request from a client 105 for an object 209 in a server 201, the client 105 passing the object reference to the BOA 225. The BOA 225 determines whether there is an active implementation of the object 209 or method and if so, the BOA 225 passes the request to the object 209, otherwise, the BOA 225 retrieves the implementation code for the object 209 from secondary storage 107, starts a new process for the invoked object, executing the implementation with the processor 111. The BOA 225 will also manage deactivation of objects 209 and implementations that are no longer being used, or that are explicitly terminated by a client 105 or server 201, reclaiming resources allocated to the object 209 in the processes or databases maintained by the BOA 225.

Each server 201 in the host computer 101 includes a number of objects 209, each of which encapsulates data associated with the object 209 and its state, and executable code for implementing functional operations, or methods of the object 209 on the data or other objects 209. An object 209 is manipulated by clients 105 or other objects 209 through an interface definition that specifies the operations, attributes, and exceptions that an object 209 provides. The objects 209 are distributed objects, distinguished from conventional objects in object oriented programming languages in that the interface of an object 209 is defined in an interface definition language, which is then mapped to an implementation language, such as C++ or C. This allows objects 209 to have multiple implementations in various languages, while still maintaining a consistently defined interface. A client 105 does not have to have any information about the underlying implementation of the object 209, but merely has to have the interface for the object 209. The objects 209 are distributed in that a client 105 may invoke an object 209 existing anywhere on the network 103, including in the address space of a client 105, or any number of host computers 101, by using an object reference for object 209 (such object reference might be obtained, for example, through the use of a naming server 227) and the various BOAs 225 on the host computers 101 to access the object 209 from the object reference.

Coupled to the host computer 101 by the network 103 is a naming server 227. The naming server 227 maintains a name space directory 229 including number of naming contexts, each of which includes a set of name bindings. A name binding is an association between an arbitrary object name, and an object reference uniquely identifying an object 209 within a server 201 and further identifying the server 201, and host computer 101 including the object 209. The naming server 227 provides methods for binding a name to an object reference so that the object 209 associated with the object reference can be accessed from the name, and for resolving names provided by clients 105 in order to provide an object reference to a client 105. With an object reference, a client 105 can directly invoke a server 201 or any object 209 within a server 201. The naming server 227 provides clients 105 with a service that allows access to distributed servers 201 before the client 105 has an object reference. Multiple naming servers 227 may be supported, with clients 105 transparently accessing various naming servers 27 on the network 103. In the preferred embodiment, a naming server 227 is included in each host computer 101, and supports objects 209 within the host computer 101; multiple naming servers 227 then work in conjunction to provides clients 105 with object references for local objects 209.

A factory object 211 may be associated with each object 209, for performing a single method that is called by a client 105 to create a new instance of the type of object 209. The factory object 211 is registered in the name space directory 229 of the naming server 227, which is accessed by clients 105 for obtaining object references. Each factory object 211 includes a static create member function that creates a new object 209 of the type specific to the factory object 211, and returns an object reference to the new object 209. An initialize function is provided in created object 209 to perform any needed initialization on the object's state. Typically there is only one instance of a factory object 211 implementation for each object 209 in the server 201. The instance of each factory object 211 is created when the server 201 is installed in the host computer 201 and registered in the naming server 227. An object 209 need not have an associated factory object 211, for example, where the object 209 is not public and available only to the server 201, or where the server 201 is designed to have a single instance of a particular type of object 209.

Each server 201 also includes a server spy 213 object for determining runtime information about the server 201, so that remotely situated clients 105, for example during application development and debugging, can obtain current process and related information. The server spy 213 is a distributed first class object embedded in the server 201 during application development. The server spy 213 differs from other objects 209 in the server 201 in that the methods and data of the server spy 213 operate on, and reflect, the current runtime state of the server 201, whereas the other objects maintained by the server 201 will generally provide application methods and data. Throughout the remainder of this disclosure, references to "the server" and "the server spy" refer to one server 201 and its embedded server spy 213, and it is understood that the functionality described for these respective entities applies to each respective server 201 and server spy 213 in the host computer 101.

When a server 201 is executed by the processor 111 it is an active process in the host computer 101, and the server spy 213 is part of that server 201 process. Accordingly, the operations and attributes of each the server spy 213 are with regard to the current state of server 201 process in which the server spy 213 is embedded. Thus, with multiple server 201 processes executing on host computer 101 at one time, there is a server spy 213 in each server 201 process, and each such server spy 213 reports on the particular server 201 process in which it is embedded.

The server spy 213 does not persistently maintain any information, again, because the server spy 213 exists to provide runtime information about a server 201, and this information is transient and limited to the process created for the particular execution of the server 201 by the processor 111. In an alternative embodiment, a server 201 may contain multiple server spy objects 213, providing, for example, different levels of access to the server 201 to different user classes, domains, or the like.

A server spy 213 is included in each server 201 by making it a part of a runtime library which is linked with each server 201 developed and compiled in the distributed object programming environment. The server spy 213 is included in the runtime library by creating an interface definition language file, commonly known as an IDL file, defining the interface of the server spy 213. This interface may be defined by either the provider of the development environment, the operating system provider, or the systems programmer, to best accommodate the needs of users of the system 100. Separate implementation definition and implementation code files are then written to implement the methods of the server spy 213; these files are compiled and then linked into the runtime library, which is used by applications developers to create new servers 201. Thus, the server spy 213 has an implementation like any other object 209, but the applications developer does not have to include the server spy 213 explicitly. Rather, the server spy 213 appears automatically in the servers 213 during compilation and linking. This embedding process makes all servers 201 in the distributed object programming environment capable of responding to a known set of messages, defined in the interface of the server spy 213, without any work by the applications developers. This allows the system administrator to develop generic administration tools that are guaranteed to be able to communicate with any server 201 via the server spy 213. Once such administration tool is the server administrator 203, which is more completely described in the related application referenced above.

The server spy 213 implements an IDL interface, and thus can be called by clients 105 which exist in processes external to the server 201 process including the server spy 213. This distinguishes the server spy 213 from conventional language specific objects that are normally linked into a server 201 or application program by the development environment compiler and linker, since these objects are only accessible to other objects that are part of the server 201 process.

Because the state of server spy 213 reflects the state of the server 201 at any given time, the server spy 213 effectively instantiates the server 201 as a distributed object in the system 100, providing clients 105 with the same type of access to the internals of the server 201 that such clients 105 have to other distributed objects 209 in system 100. In the absence of the server spy 213, clients 105 would be unable to determine and manipulate the server 201 in the same manner as any other distributed object 209, since conventionally, a server 201 or application program, when executing, is merely a transient process that cannot be accessed separately by clients 105 in the distributed environment. Accordingly, server spy 213 provides for increased flexibility and efficiency in operation and development of servers 201.

The server spy 213 is created when a server 201 is registered with the object request broker environment. Registration notifies the BOA 225 of the existence of the server 201, particularly the path name, arguments, and environment for the server 201, and which interfaces the server 201 implements. Registration also creates a factory object 211 for those objects 209 for which a factory 211 is publicly available, binding a name specified for the factory 211 object by the applications programmer with an object reference in the naming server 227. The server spy 213 is created by an invocation of a constructor function for the server spy 213. In the preferred embodiment, the constructor function determines the server administrator 203 associated with the server 201 that the server spy 213 is to be embedded in, and then assigns the server spy 213 to that server administrator 203 by providing the object reference of the server spy 213 to the server administrator 203. This allows the server administrator to invoke the methods of the server spy 213 as needed. In embodiments where there is no server administrator 203, other methods may be employed to make the server spy 213 publicly available. During registration, the server spy 213 will execute its facilities attribute (as described below) to determine what tracing facilities are available in the server 201, providing this information to the server administrator 203. The server spy 213 may also be registered with the BOA 225 so that the server administrator 203, or remote clients 105 may access the server spy 213 through its object reference.

Figure 6:
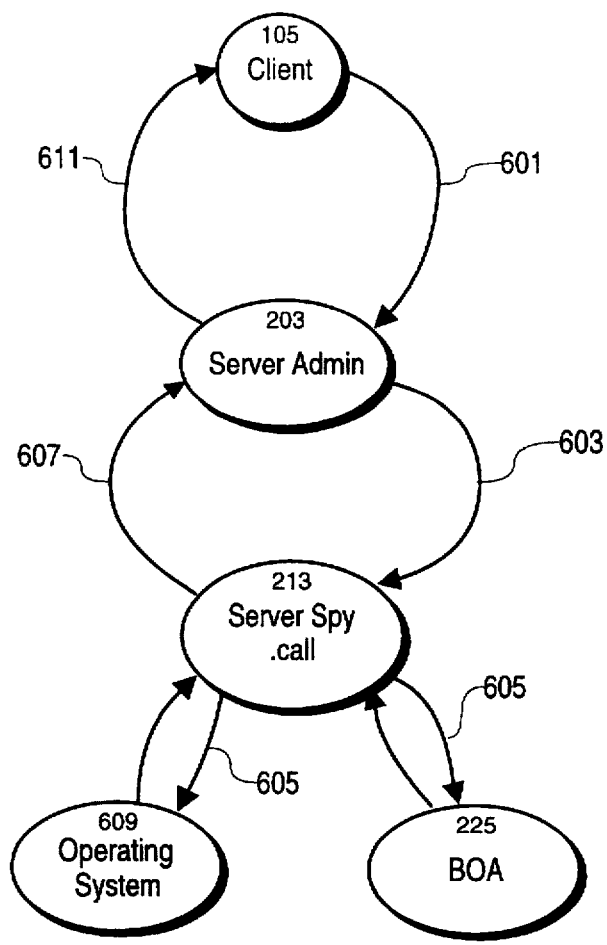
FIG. 6 is a dataflow diagram of the method of obtaining state information about a server.

FIG. 6 illustrates the call architecture for using the server spy 213 to obtain current state information about a server 201. In the preferred embodiment, clients 105 do not have public access to the server spy 213. Rather, access is obtained indirectly through the server administrator 203. A client 105 invokes 601 an appropriate method on the server administrator 203 for obtaining current state information about the server 201 associated with the invoked server administrator 203. (In an alternative embodiment, the server spy 213 is publicly accessible to clients 105 on the network 103, and may be invoked 601 directly).

The server administrator 203 in turn calls 603 the server spy 213 for the desired information. The server spy 213 executes a particular method, such as those described below, either invoking 605 further methods provided in the BOA 225, or the operating system 609, or other lower level object or process. The server spy 213 then returns 607 the resulting information to the server administrator 203. The server administrator 203 may further return 611 this information to the client 105, if desired by the client 105. The current state information obtained by the server spy 213 can include both dynamic information dependent on the server 201 process, such as the process identification of the server 201, non-runtime information that alters the runtime operation of the server 201, such as the operation of predefined API calls in the server 201, or even configuration information, such as the execution definition of the server 201.

Each server spy 213 includes a number of attributes used to transiently store and manipulate information about the server 201 process that the server spy 213 is part of, but the specific functionality of the server spy 213 can vary according to the needs of the system administrator and other users. A pseudo-interface definition file of one embodiment of the interface of the server spy 213 is shown in Appendix A; the interface disclosed in Appendix A is useful to define the functionality of the server spy 213 as described herein. It is understood that other interface definition files may also be suitably used to define a server spy 213 object. Similarly, various implementation files can be used to implement the interface definition of the server spy 213.

Because one of the functions of the server spy 213 is to make the server 201 available to remote client 105 as an observable process in the host computer 101, the server spy 213 includes an attribute for identifying and storing the process identifier provided by the operating system for the server 201 process including the server spy 213. An example of the interface for this attribute is the pid attribute. This attribute allows a client 105 that is invoking the server 201 to access any operating system functions that examine a process, including its memory allocation, execution time, and the like, for determining such information about the server 201 containing the server spy 213. In the absence of the server spy 213, a client 105 could not obtain this information about the server 201 because the client 105 does not have a name or object reference for the server 201. In the preferred embodiment, the pid attribute of the server spy 213 provides an interface to a method that calls an existing operating system function that returns the process identifier of the server 201, for example, using the getpid( ) command in the UNIX® operating system. With the pid attribute, the server spy 213 will return the process id of the server 201 process to the server administrator 203 associated with the server 201, which would then pass the process id to client 105.

The server spy 213 also includes an attribute for determining and storing a count of the active objects 209 within the server 201, that is those objects 209 which are currently running and allocated resources, particularly portions of the addressable memory 113. An example of the interface for this attribute is the active_object attribute. Where the implementation language of the server 201 is C++, for example, the active_object attribute indicates the number of C++ objects 209 that exist in the server 201 to service requests originating from clients 105 in the system 100. The active_object attribute provides a measure of how heavily loaded the server 201 is at any one time, and supports resource management and utilization by the client 105 and the operating system.

Each server 201 contains one or more implementations, and each object 209 in server 201 belongs to exactly one of these implementations. The server spy 213 maintains separate counts for the number of active objects created by each implementation when the implementation is executing. An example is the ActiveObjects struct.

In the preferred embodiment, the count of active objects 209 is maintained as follows. When a server 201 is initialized, a linked list of all implementations is created; this is a list of the individual classes for the object 209 provided in the server 201. Each implementation in the list is a header to a separate linked list of active objects 209 for that implementation; each such linked list is updated as new instances of objects 209 of the given class are created or destroyed. The code for creating these linked lists is provided by a runtime library that is linked into the code of the server 201 when the server 201 is compiled by the applications developer. The server spy 213 has direct access to these linked lists. When a count of active objects is requested by a client 105, by invocation of the active_objects attribute, the server spy 213 traverses the linked list of implementations, and for each implementation, counts the current number of object instances in the linked list associated with the implementation. This count is stored in the ActiveObject struct with the name of each implementation. The server spy 213 totals the count of active objects across all implementations, and returns this to the client 105. Alternatively, a count of object instances for each implementation may be maintained in the implementation linked list, with the server spy 213 traversing only this list. In the preferred embodiment, the server spy 213 has exclusive access to the linked list structures, thereby ensuring an accurate count of active objects. Exclusive access prevents automatic deallocation by the reaper 217 because the reaper 217 cannot obtain access to the list of active objects, which is necessary to perform the deallocation.

The server spy 213 also includes a flag for indicating whether automatic deallocation is to be performed by the reaper 217. An example of the interface for this attribute is the boolean attribute reaping. A client 105 may wish to disable the reaper 217 in order to debug the server 201, thereby preventing the server 201 from being terminated by the reaper 217 during the debugging process, which may make the server 201 appear inactive for long periods of time. Similarly, a system administrator may want to disable the reaper 217 to inspect the server 201, alter its configuration information, and the like.

Figure 3:
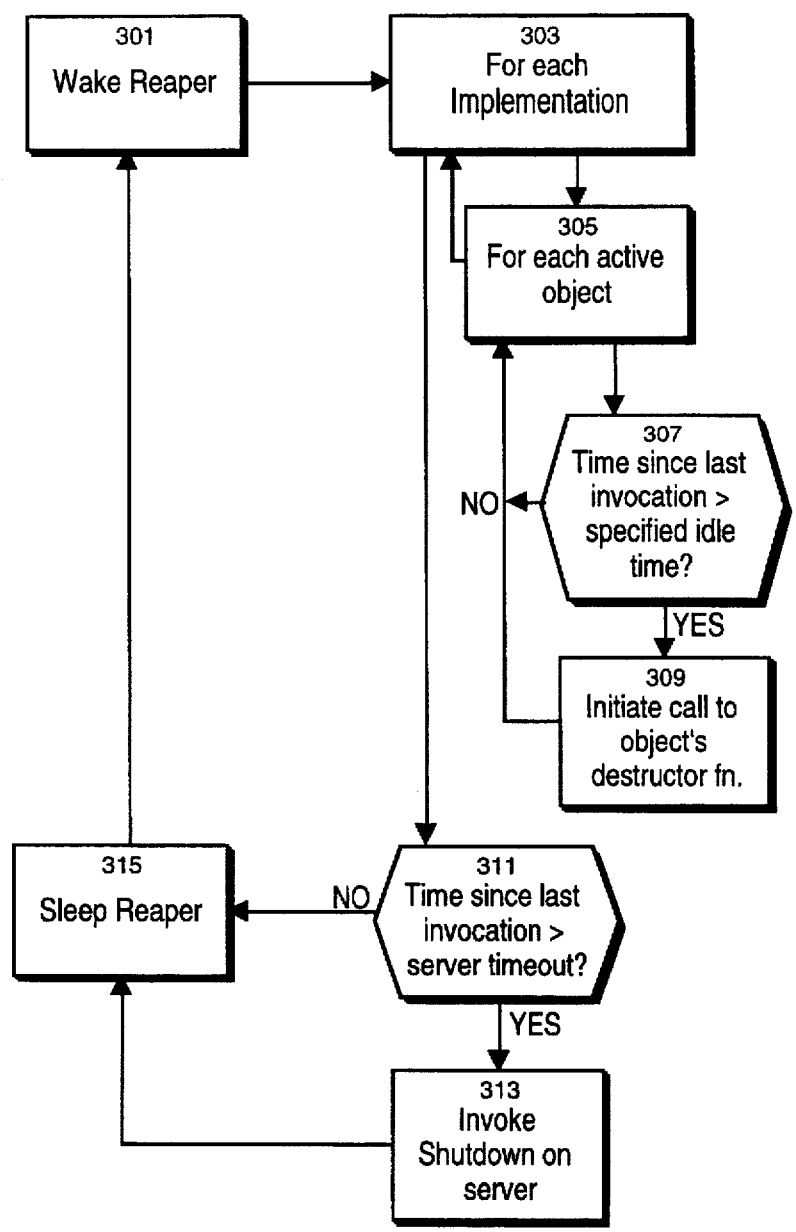
FIG. 3 is a flowchart of the process of automatically deallocating idle objects in a server.

The reaper 217 is a separate thread executing in each server 201 process. When the reaping flag is set, the reaper 217 will operate normally, automatically deallocating resources from objects 209 that have been idle for a specified period of time, as preferably established by the applications developer. To determine which objects 209 are active, the reaper 217 obtains exclusive access to the linked lists of active objects, as described above. FIG. 3 illustrates a flowchart for one embodiment of the method implemented by the reaper 217. After waking 301, the reaper 217 loop 303 over all implementations in the server 201 in which the reaper 217 is embedded. Looping 305 over the linked list of active objects for each implementation, for each active object 209, the reaper 217 determines 307 whether the object 209 has not been invoked within the time period specified, that is, if the difference between current time and a time stamp value for the last invocation of the object 209 is greater then the specified idle time. If so, the reaper 217 deallocates 309 resources from the idle object 209 by indirectly calling its destructor functions in conventional manner. Otherwise, if the reaping flag is not set, the reaper 217 will itself be inactive, and active objects in the server 201 will be deallocated only by explicit termination of the server 201. Alternatively, instead of a single attribute functioning a flag to the reaper 217, the server spy 203 may include distinct methods for directly starting and stopping the reaper 217; this would allow direct manipulation of the reaping function.

The server spy 213 includes an attribute for determining and setting the cycle time of the reaper 217, that is, how frequently the reaper 217 of each server 201 is activated by the host computer 101 to perform deallocation. An example of the interface for this attribute is the reaper_cycle_time attribute.

The server spy 213 also has an attribute for determining and setting an idle time specific to the server 201 containing the server spy 213, that is, the number of seconds during which no object 209 within the server 201 is invoked. An example of the interface for this attribute is the server_timeout attribute. Each time an object within the server 201 is invoked, current time is stored in the server 201. Referring to FIG. 3, the reaper 217 compares 311 this time value with the current time, and if the difference exceeds the specified idle time in the server_timeout attribute, then the reaper 217 deactivates 313 the server 201 by calling the server administrator 203 associated with the server 201, indicating server 201 is being terminated, and then invoking a shutdown method provided by the shutdown API 223.

The distributed object programming environment used in system 100 supports a number of application programming interfaces (APIs) for enabling each server 201 to access various operating system calls and predefined application routines, such as input and output functions, user interface management, and the like. In this fashion an API alters the operational characteristics of a server 201 by providing functionality within the server 201 that is not directly coded by the applications developer. Rather, an API provides the applications developer with set of calls that can be included in the implementation code of an object 209 or server 201 for invoking API functions during execution. There is provided in each server 201 a tracing API 219, a logging API 221, a reaper API 217, and a shutdown API 223.

The tracing API 219 provides for control of the conditional output of diagnostic information about a server process, useful in the determination of errors generated at runtime, or for identifying the causes of improper results from application execution not involving an error. The logging API 221 provides for directing where such diagnostic information is output. Separating these two functions increases the flexibility of diagnostic tools, and allows for various remote clients 105 to individually control the logging and tracing behavior of a given server 201. The reaper API 217, provides a method for automatic deallocation of inactive or idle objects 209 and resources. The shutdown API 223 provides a method for the graceful shutdown and cleanup of the server 201.

Conventionally, an applications developer is limited to including various API calls in the server code, and permanently configuring their operation, so that an application user has no means for dynamically configuring which API calls are executed once the server 201 is compiled into an executable application. For example, to trace execution of a server 201, an applications developer would include specific API calls, in the desired tracing locations; this code could not be changed once the server 201 is installed as an executable application, so that the API call is always operable, thereby limiting the flexibility of such tracing features. The applications developer may provide for conditional control of the trace statements, for example to output all data stored in a server 201, but only when trying to diagnose a particular problem. However, such routines add complexity to the server 201. Additionally, the applications developer would identify in the server 201 code specific log files for outputting the trace information, again, limiting the user's or system administrator's ability to alter such output.

In order to provide for uniform tracing functions, and simplify the process for the applications developer, the distributed object programming environment provides specific APIs for tracing and logging functions. The server spy 213 object can enable and configure these various APIs within a server 201 during execution, even where the user is remotely situated from the host computer 201 maintaining the server 201.

The tracing API 217 provides for conditional tracing control through facilities. A facility is a set of tracing flags that are available as a predefined set. The applications developer can define various sets of facilities to include in the server 201 code. For example, facilities can be defined to track loop entry or exit, loop execution time, disk reads or writes, and the like. Each trace flag in a given facility is associated with a specific method that implements a trace function included in runtime library of the distributed object programming environment, or separately provided by the applications developer. The applications developer specifies in the server 201 code, at various desired locations, a trace message specifying a given facility, one or more flags for controlling various trace functions, and an output value. A function prototype (in C++) is:

DOT_TRACE(char* facility_name, char* trace_flags, char* format, ...);

where DOT_TRACE is an API call provided by the tracing API 219; any number of output values can be specified following the format specification.

In a distributed object programming environment, these tracing and logging functions cannot be directly accessed for remote servers 201 by the clients 105. However, the server spy 213 provides remote clients 105 the ability to control this information for any server 201 on the network 103. The server spy 213, in conjunction with the trace 219 and log 221 APIs, enables such users to directly manipulate tracing and logging conditions for a server 201 during execution, by providing access to API calls that control the operation of the API functions. The applications developer incorporates various desired API calls in the server 201 application. During execution of the server 201, a remotely situated client 105 can invoke the server spy 213 to configure the operation of these calls at runtime.

For controlling tracing, the server spy 213 can invoke (enable/disable) a given facility and specific trace flags available in the facility, resulting in the generation of the output value when the trace message is encountered during execution of the server 201. The output of trace messages for a given server 201 are sent to the tracing API 217 which separately maintains a list of log files for storing all trace outputs from the server 201. The log 219 is used to determine the appropriate log file or files for the server 201, and outputs the trace message there. The separation of tracing control and log control enables remote clients 105 to individually manipulate both the tracing operation and the output location for a server 201.

The distributed object programming environment of the preferred embodiment provides a "default" trace facility with the following trace flags:

| | |
|---|---|
| admin | provides administrator control |
| config | configuration information |
| heartbeats | track heartbeats sent by server |
| install | installation details |
| object | object lifecycle internal details |
| reaper | removal of inactive objects |
| run_verbose | extensive server startup and shutdown information |
| data | persistent data operations |

Other trace facilities may be defined by the applications developer as desired in an API call to the tracing API 219.

Accordingly, to access the tracing facilities included in the server 201, the server spy 213 includes the following functionality. First, the server spy 213 is able to inform a client 105 of what facilities are available within a server 201. A facilities attribute outputs to the client 105 a list of facilities, including for each facility a facility name, a description of the function or purpose of the facility, the set of trace flags included in the facility, and boolean settings of the trace flags. The server spy 213 then can enable or disable any of the listed facilities, with the client 105 invoking an enable or disable method of the server spy 213, specifying a facility name, and a set of trace flags to be set. An example of the interface for these methods are the trace_enable ( ) and trace_disable ( ) methods.

For example, a client 105 may enable a default facility called "default" with the flags "run," and "method," by passing the following command to the server spy 213:

trace_enable("default","run:method");

In addition, the server spy 213 allows the client 105 to enable all facilities in a server 201, or all trace flags in a given facility, or both:

trace_enable("all","flag_name");

trace_enable("facility_name","all");

trace_enable("all","all");

Similarly, the client 105 can disable all facilities previously enabled with:

trace_disable("all","all").

As noted above, separation of logging and tracing functionality provides for increased flexibility in the control of the server 201. Conventionally, the operating system will support a limited number of predefined log files. These log files will be used to record all system information, and not just information related to a specific server 201 or host computer 101. However, a system administrator may be interested only in a specific host computer 101 or server 201. Accordingly, the server spy 213 includes methods for controlling the printing for log files specific to any individual server 201 or host computer 101, for example, with the file_start ( ) method starting a new log file, specified by the user, and a complementary file_stop ( ) method for closing and saving a log file specified by the user. In the preferred embodiment of the server spy 213, a log file structure is maintained for each set of log files, storing the name of the log file, its open mode, the maximum file size in megabytes, and the number of swap files, if any. When the file_start ( ) method is invoked, the log file structure is passed to the method, a new log file of the specified parameters in the log file structure is created. When the file_stop ( ) method is invoked, only the name of the log file need be passed, after which no further output is written to the log file.

To create a new log file, the server spy 213 calls the log API 221, passing a log file path name, which in turn creates a new log file, and places the log file on a global list stored within the server 201 so that all trace messages and error messages are output by the trace API 219 to the new log file. The designation of log files is read by the trace API 201 of the server 201 when an enabled trace facility in encountered during execution of the server 201, the trace API 219 automatically storing output value of the trace message in the new log file. The server spy 213 supports conventional exception handling for file manipulation.

In addition, because the user, such as a system administrator, may desire to log information in the standard system log files, the server spy 213 includes a flag, the boolean attribute use_syslog, to control this option. When the flag is set, the trace API 219 and log API 221 will mirror trace output and, error information for the server 201 to the operating system's log files, otherwise this information will be stored only in the specified log files for the server 201.

A server 201 that has been operating for significant periods of time may create very large log files, whereas a server 201 that is infrequently used may have a very small log file. In order to accommodate this varying behavior while efficiently conserving secondary storage space, the server spy 213 provides a method, file_set_max_mbytes ( ), for changing the maximum size of log files for the server 201. The server spy 213 will call the log API 221 which then stores a maximum file size for a specified log file of the server 201. This limit value is used by the trace API 219 and log API 221 when information is output to the log files, as further described with respect to FIG. 4.

Figure 4:
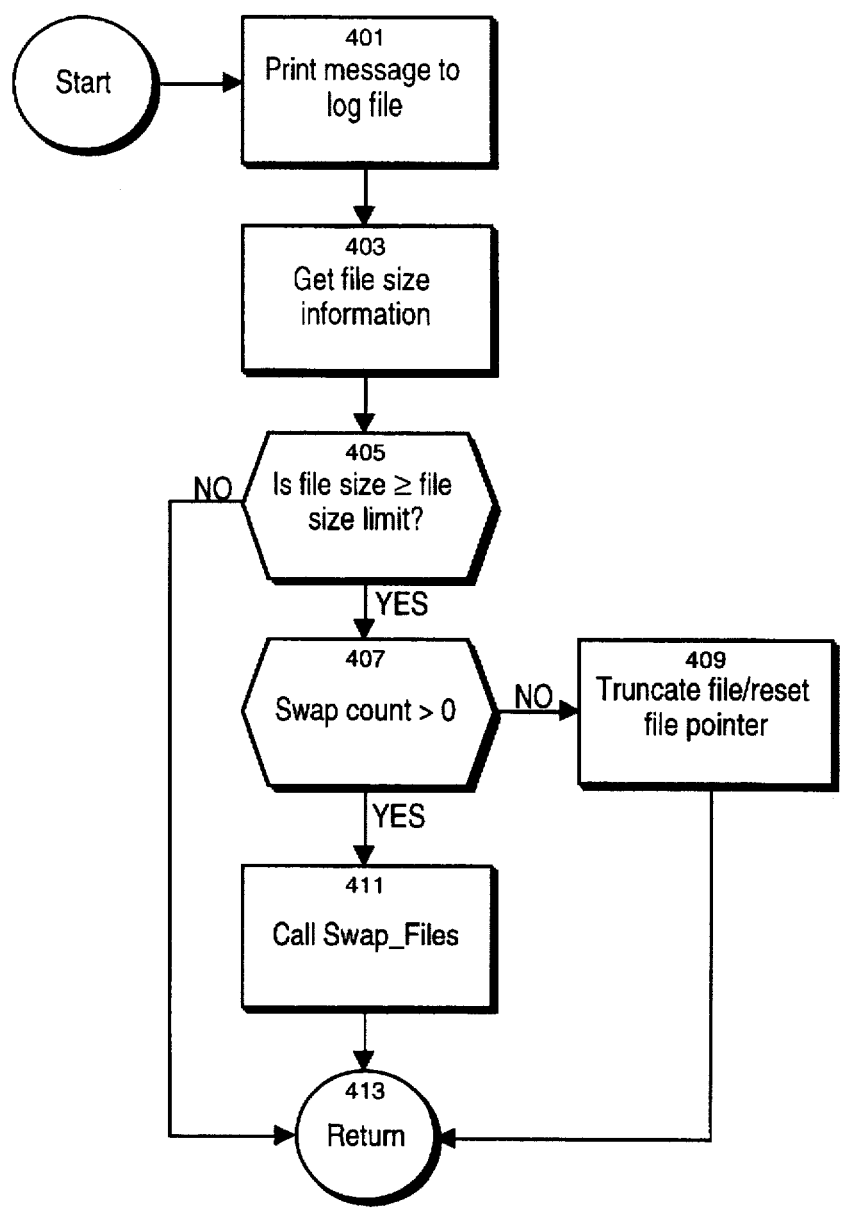
FIG. 4 is a flowchart of the process for manipulating log files.

Over time, most servers 201 will exceed the size of their log files. The server spy 213 provides a system administrator the ability to specify a number of log files that can be swapped on a rotating basis. An example of the interface for this method is the file_set_swap_count ( ) method. Swapping allows a given log file to be examined, and either deleted or archived as needed, while still providing an active log file for logging the server 201. FIG. 4 shows a flowchart for one embodiment of a method of the log API 221, executed by the processor 111 for setting and manipulating swappable log files.

To print to swap files the processor 111 prints 401 the output value of the trace message, or other log information to the designated log file, previously specified in the server 201. The processor 111 calls 403 an operating system function to obtain the current size of the log file. This size is compared 405 to the maximum file size as specified by a client 105 via the server spy 213. If the file size equals or exceeds the maximum, the processor 111 checks 407 whether the swap count, number of swap files specified for use in swapping, is greater than zero. If so, the processor 111 invokes 411 a swap files routine to physically swap the log files. Otherwise, the processor 111 simply resets 409 an end of file pointer, so that the log file is written over by new log or trace information.

Figure 5:
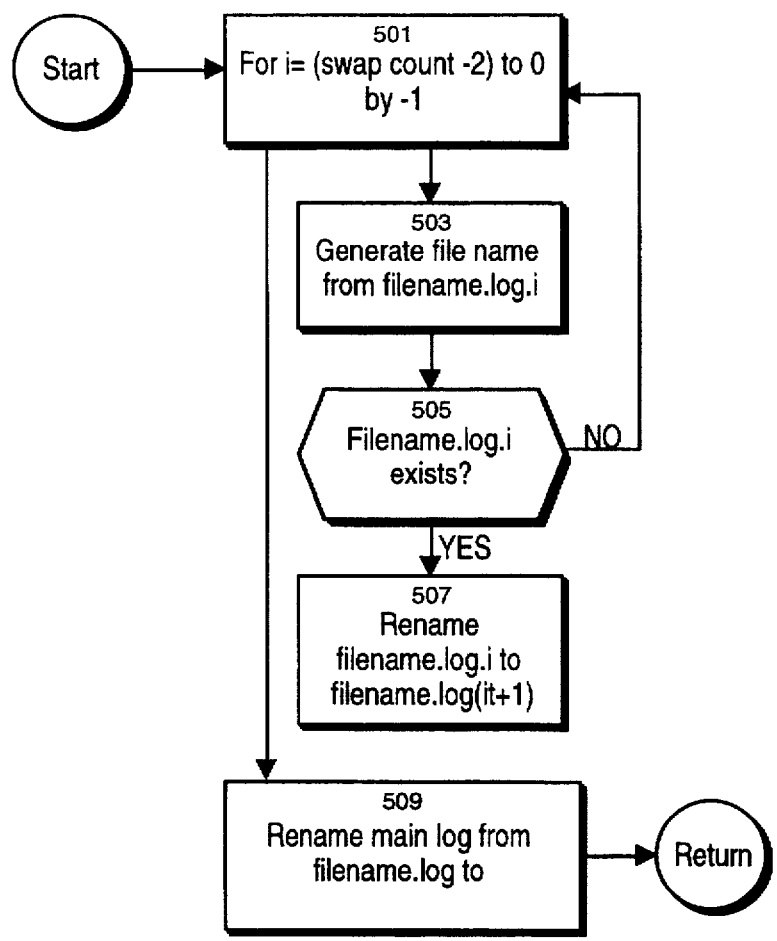
FIG. 5 is a flowchart of the process for swapping a set of log files.

FIG. 5 illustrates one embodiment of swap file method for swapping log files. In this method, the oldest of a set of swap files is overwritten by successive renaming of newer swap files. Each log file is given a name in the form of filename.log.i, where i is an iterated value; the main, or active log file is simply filename.log. When invoked, the trace facility or logging function will loop 501 over the set of log files specified by the user, beginning with the value (swap_count-2) and iterating to zero. From the iterated value of i, a new file name of the form filename.log.i is created 503. If a file of this name already exists 505, and it will where there is more than one log file, then the file is renamed from filename.log.i to filename.log.(i+1). This will overwrite each of the existing log files, beginning with the oldest one. Once all the old log files have been renamed in this fashion, the main log file is renamed 507 from filename.log to filename.log. 1.

The server spy 203 includes a shutdown method for invoking the shutdown API 223. This method allows a client 105 to gracefully terminate the server 201. In a multithreaded environment, there is considerable difficulty in handling signals received from the operating system, and determining the proper target for such signals. Conventionally, a UNIX® kill command would be used to shutdown a given server 201. However, because of the multithreaded environment, there is no way to ensure that the proper thread in the server 201 will receive the kill command, and thus the wrong thread may be terminated. The shutdown method the server spy 203 bypasses this problem by directly invoking the shutdown API 223. This allows greater control over the operation of the server 201 by system administrator during debugging and other administrative functions. In addition, this method allows a server 201 to hold itself down before the shutdown. Without such a hold down operation, a client 105 cannot be sure that a call will not come between a shutdown( ) invocation and a hold_down( ) invocation, since a hold_down( ) cannot be invoked first as the shutdown( ) invocation would be rejected, as would any client call.

---

APPENDIX A

```
// File: ServerSpy.idl
//
// © 1994 Sun Microsystems, Inc.
//
#ifndef _SERVER_SPY_IDL
#define _SERVER_SPY_IDL
#pragma ident "@(#)ServerSpy.idl 1.19 95/01/16 Sun Microsystems"
#include <admin/DomfServerAdmin.idl>
#include <admin/DomfAdmin.idl>
// A single ServerSpy instance is embedded in every ODF server.
// It provides runtime information about the server as it executes
// and supports controlling tracing/logging configuration.
// It is provided to the domf as the Server Administrator for graceful
// shutdowns when the domf daemon stops.
//
module DatInt {
//****************************************************
//
// Structure and typedef declarations
//
//****************************************************
    typedef unsigned long Seconds;
    typedef unsigned long Objectcount;
    // Interface and server version structure
    struct Version {
        unsigned long major;
        unsigned long minor;
        string date;
    };
    // TraceFlag: used to control conditional output.
    struct TraceFlag {
        string name;
        string description;
        boolean enabled;
```

-continued

APPENDIX A

```
};
typedef sequence<TraceFlag> TraceFlags;
// Facility: used to group sets of flags.
struct Facility {
  string name;
  string description;
  TraceFlags flags;
};
typedef sequence<Facility>Facilities;
exception UnknownFacility {};
exception UnknownTraceFlag {
  string trace_flag; // Unknown flag
}:
// LogFile: a single file being logged to
struct LogFile {
  string name;
  string open_mode;
  float max_mbytes;
  long swap_count;
};
typedef sequence<LogFile> LogFiles;
exception FileError {    // UNIX file error
  string details;   // Explanation of error
};
exception AlreadyOpened {};  // Log file has already been opened.
exception SpecialFile {};    // Log file is not a regular UNIX file,
// and max_mbytes or swap_count > 0.
exception NotOpened {}; // Not currently logging to this file.
//************************************************************
//
// Serverspy interface
//
//************************************************************
interface ServerSpy DOMF_ServerAdmin, ObserverAdmin {
// Shutting down
void shut_down_hold(
  in BoaDbAdmin::HoldDownDuration hold_down
);
//
// Information about the running server
//
// Total number of active (invoked and unreaped) objects.
readonly attribute ObjectCount active_object_count;
// Number of active objects for the implementation.
struct ActiveObjectcount {
  string implementation_name;
  ObjectCount active_object_count;
};
typedef sequence<ActiveObjectCount>ActiveObjectCounts;
readonly attribute ActiveObjectCounts active_object_counts;
// List of all facilities provided by the server.
readonly attribute Facilities facilities;
//
// Inspecting and changing the behavior of the reaper
//
// Get/set seconds server must be idle before reaper will shut it down.
attribute Seconds server_timeout;
// Get/set how often the reaper wakes up and checks for inactivity.
attribute Seconds reaper_cycle_time;
// Get/set whether to preform automatic deactivation of objects and
// server itself.
attribute boolean reaping;
//
// Tracing control
//
// Enable one or more trace flags. Flags are space-delimited
// keywords. Either facility or flag can be "all".
// Adds to the currently enabled set, does not
// override any current settings.
void trace_enable(
  in string facility_name,
  in string flags
) raises(UnknownFacility, UnknownTraceFlag);
// Disable one or more flags. To turn all tracing off, use "all"
// for both facility and flags.
void trace_disable(
  in string facility_name,
  in string flags
```

-continued

APPENDIX A

```
) raises(UnknownFacility, UnknownTraceFlag);
// Check whether flags for a facility are enabled.
boolean trace_is_enabled(
  in string facility_name,
  in string flags
) raises (UnknownFacility, UnknownTraceFlag);
//
// Logging output control
//
// Flag whether to send output to syslog daemon.
attribute boolean use_syslog;
// Information about log files being printed to;
readonly attribute LogFiles log_files;
// Start printing to a new log file.
void file_start(
  in LogFile new_file
)raises(FileError, AlreadyOpened, SpecialFile);
// Stop printing and close a log file.
void file_stop(
  in string name
) raises(FileError, NotOpened);
// Change the maximum size in Mb of a log file. Raises
// NotOpened if not currently logging to this file.
void file_set_max_mbytes(
  in string file_name,
  in floatmax_mbytes
) raises (FileError, NotOpened, SpecialFile);
// Change the maximum number of swapped out log files
// (file_name.1, .2, etc.). Raises NotOpened if not
// currently logging to this file.
void file_set_swap_count(
  in string file_name,
  in long swap_count
) raises (FileError, NotOpened, SpecialFile);
// This interface's version
readonly attribute Version spy_interface_version;
}; // Serverspy interface
};
#endif      // SERVER_SPY_IDL
```

We claim:

1. A computer system for providing a distributed object interface to a server executing as a server process, the system comprising:

a server including at least one distributed object as machine readable and executable structures, the server executing as a server process and not separately existing as a first class object; and at least one first class object within the server including at least one machine executable structure adapted to execute as part of the server process and provide runtime information for the server process without interrupting execution of the server process, the first class object having an interface available to objects external to the server to enable manipulation of the server as a first class object.

2. The computer system of claim 1, further comprising:

a machine executable structure adapted to determine a process identification code for the server process.

3. The computer system of claim 1, wherein each distributed object within the server is an instance of an object implementation, and is either active, idle, or inactive, further comprising:

a first machine executable structure adapted to determine a number of distinct object implementations within the server; and, a second machine executable structure adapted to determine for each object implementation a number of active objects of the object implementation.

4. The computer system of claim 3 further comprising:
primary storage for storing the server process;
a processing unit for executing the server as the server process in the primary storage, the server process in the primary storage including at least one object executable by the processing unit as part of the server process;
a storage structure stored in the primary storage and having a stored representation of the object implementations and object instances contained within the server;
wherein:
the processing unit executing the server process generates the process identification code;
the second machine executable structure reads the storage structure to determine the number of distinct object implementations; and
the third machine executable structure reads the storage structure to determine the number of active objects.

5. The least one first class object of claim 1, further comprising:
a machine executable structure adapted to enable and disable automatic deallocation of resources held by idle objects within the server;
a machine executable structure adapted to establish a cycle time for the automatic deallocation of idle objects; and
a machine executable structure adapted to establish an maximum time interval for which the server containing the first class object can be idle, such that the server is automatically shutdown after a time interval equal to or exceeding the maximum time interval.

6. The least one first class object of claim 1, further comprising:
a machine readable structure adapted to identify at least one facility contained within the server, the facility including a set of trace flags;
a trace enable machine executable structure adapted to selectively enable a user specifiable facility and set of trace flags within the facility; and,
a trace disable machine executable structure adapted to selectively disable a user specifiable facility and a set of trace flags within the facility.

7. The least one first class object of claim 6, further comprising:
a machine executable structure adapted to indicate whether trace information output by the facilities within the server is incorporated into an operating system message log; and
a machine executable structure adapted to specify at least one log file for storing trace information output by facilities within the server.

8. A computer implemented method of embedding an object within a server to provide runtime information about a server process executing the server, comprising the steps of:
defining an object interface definition language file for a first class object, the file specifying:
an interface to a first attribute or operation for obtaining a process identification number for a server process not separately existing as a first class object;
an interface to a second attribute or operating for obtaining a host name for a computer executing the server process;
defining an implementation file specifying source code of the first class object for implementing the first and second attributes or operations, respectively;

compiling at least one object for performing a function of the server, the object incorporated into the server, to produce a server file;
compiling the interface definition language file of the first class object to produce a set of source code files for interfacing the interface definition language file of the first class object to the implementation file of the first class object;
compiling the source code files and implementation file of the first class object to produce a first class object file;
linking the first class object file to the compiled server file to produce an executable server file; and
executing the server file to create a server process containing an instance of a first class object.

9. A computer implemented method for determining current state information about a server executing as a server process in a distributed object environment, the server not separately existing as a first class object, the method comprising the steps of:
receiving in a first object external to the server a request from a client object to determine current state information for a server;
invoking from the first object an operation on a second object known to be embedded in the server, the operation determining the current state information of the server;
executing the operation of the second object as part of the server process without interrupting the server process to determine the current state information; and
providing the current state information to the first object.

10. The method of claim 9, further comprising, before the step of receiving, the step of:
embedding in the server at least one second object, each second object having at least one operation for determining current state information about the server.

11. The method of claim 9, wherein the operation of the second object provides a process identifier for the server.

12. The method of claim 9, wherein the operation of the second object provides a count of active objects within the server.

13. The method of claim 9, wherein the operation of the second object provides a count of object implementations within the server.

14. The method of claim 9, wherein the operation of the second object provides a list of tracing facilities within the server.

15. The method of claim 14, wherein a second operation of the second object enables at least one tracing facility within the server.

16. The method of claim 14, wherein the second operation of the second object selectively enables at least one trace flag in a tracing facility.

17. The method of claim 9, wherein the operation of the second object designates a log file for outputting trace and log information for conditions resulting from execution of the server.

18. The method of claim 17, wherein a second operation of the second object establishes a number of log files to be used on a rotating basis.

19. The method of claim 9, wherein the operation of the second object establishes a maximum time interval for which the server can be idle, further comprising the step of:
shutting down the server after a time interval equal to or exceeding the maximum time interval.

20. The method of claim 9, wherein the operation of the second object establishes a cycle time for automatic deallocation of resources held by idle objects within the server.

21. The method of claim 20, wherein a second operation of the second object enables automatic deallocation of resources held by idle objects within the server.

22. A computer readable memory for use in a computer system and for providing a distributed object interface to a server executing as a server process, the memory comprising:

a server including at least one distributed object as machine readable and executable structures, the server executable by the computer system as a server process and not separately instantiated as a first class object in the system upon execution;

at least one first class object within the server including at least one method adapted to execute as part of the server process upon execution of the server, and further adapted to provide runtime information for the server process without interrupting execution of the server process, the first class object providing an interface to objects external to the server to enable manipulation of the server as a first class object by such external objects.

* * * * *